(12) United States Patent
Mantell

(10) Patent No.: US 6,189,993 B1
(45) Date of Patent: Feb. 20, 2001

(54) INK JET PRINTER HAVING MULTIPLE LEVEL GRAYSCALE PRINTING

(75) Inventor: David A. Mantell, Rochester, NY (US)

(73) Assignee: Xerox Corporation, Stamford, CT (US)

( * ) Notice: Under 35 U.S.C. 154(b), the term of this patent shall be extended for 0 days.

(21) Appl. No.: 08/829,033

(22) Filed: Mar. 31, 1997

(51) Int. Cl.[7] .................................................. B41J 2/205
(52) U.S. Cl. ................................................................ 347/15
(58) Field of Search .............................. 347/15, 37, 43, 347/50, 12, 41, 40, 14, 23

(56) References Cited

U.S. PATENT DOCUMENTS

| | | | |
|---|---|---|---|
| 4,631,548 | * 12/1986 | Milbrandt | 347/15 |
| 4,965,593 | 10/1990 | Hickman | 346/140 R |
| 5,216,445 | * 6/1993 | Hirsaswa et al. | 347/15 |
| 5,245,359 | * 9/1993 | Ito et al. | 347/37 |
| 5,412,410 | * 5/1995 | Rezanka | 347/15 |

FOREIGN PATENT DOCUMENTS

623473 A2   9/1994   (EP) .

* cited by examiner

Primary Examiner—John Barlow
Assistant Examiner—Charles W. Stewart, Jr.
(74) Attorney, Agent, or Firm—David J. Arthur

(57) ABSTRACT

A liquid ink printing system for printing images having different grayscales through control of a printhead carriage velocity and the number of drops deposited per pixel location. The liquid ink printing system prints from print data an image on a recording medium including pixel locations being deposited with liquid ink drops. The printing system includes a printhead, including a plurality of drop ejectors, for depositing the liquid ink drops, a scanning carriage, coupled to the printhead, for moving the printhead across the recording medium, and a print driver, operatively coupled to the scanning carriage and to the printhead, for controlling the scanning carriage to move at a plurality of velocities, each of the plurality of velocities being associated with one of a plurality of grayscales. Each of the plurality of grayscales is characterized by a maximum number of ink drops deposited at one of the pixel locations. In a draft mode, for instance, one drops per pixel location is deposited and in a high quality mode, four drops per pixel location are deposited. For each of the grayscale modes, the scanning carriage moves at a different velocity.

17 Claims, 5 Drawing Sheets

INK JET PRINTER HAVING MULTIPLE LEVEL GRAYSCALE PRINTING

CROSS-REFERENCE TO RELATED APPLICATION

Cross-reference is made U.S. patent application entitled "Liquid Ink Printing With Small Drop Overprinting", Ser. No. 08/673,517, to David Mantell, and to U.S. patent application entitled "Checkerboard Printing for Multiple Drops per Pixel Ink Jet Printing", to David Mantell, both assigned to Xerox Corporation herein incorporated by reference.

FIELD OF THE INVENTION

This invention relates generally to a method and apparatus for liquid ink printing and more particularly to a printing system for printing images having different grayscales through control of printhead carriage velocity and the number of drops deposited per pixel.

BACKGROUND OF THE INVENTION

Liquid ink printers of the type frequently referred to as continuous stream or as drop-on-demand, such as piezoelectric, acoustic, phase change wax-based, or thermal, have at least one printhead from which droplets of liquid ink are directed towards a recording medium. Within the printhead, the ink is contained in a plurality of ink conduits or channels. Power pulses cause the droplets of ink to be expelled as required from orifices or nozzles at the ends of the channels.

In a thermal ink-jet printer, the power pulse is usually produced by a heater transducer or a resistor, typically associated with one of the channels. Each resistor is individually addressable to heat and vaporize ink in the channels. As voltage is applied across a selected resistor, a vapor bubble grows in the associated channel and initially bulges toward the channel orifice followed by collapse of the bubble. The ink within the channel then retracts and separates from the bulging ink thereby forming a droplet moving in a direction away from the channel orifice and towards the recording medium whereupon hitting the recording medium a dot or spot of ink is deposited. The channel is then refilled by capillary action, which, in turn, draws ink from a supply container of liquid ink.

The ink jet printhead may be incorporated into either a carriage type printer, a partial width array type printer, or a page-width type printer. The carriage type printer typically has a relatively small printhead containing the ink channels and nozzles. The printhead can be sealingly attached to a disposable ink supply cartridge and the combined printhead and cartridge assembly is attached to a carriage which is reciprocated, at a constant speed, to print one swath of information (equal to the length of a column of nozzles), at a time, on a stationary recording medium, such as paper, fabric, or a transparency. After the swath is printed, the paper is stepped a distance equal to the height of the printed swath or a portion thereof, so that the next printed swath is contiguous or overlapping therewith. This procedure is repeated until the entire page is printed. In contrast, the page width printer includes a stationary printhead having a length sufficient to print across the width or length of the recording medium at a time. The recording medium is continually moved past the page width printhead in a direction substantially normal to the printhead length and at a constant or varying speed during the printing process. A page width ink-jet printer is described, for instance, in U.S. Pat. No. 5,192,959, herein incorporated by reference.

Printers typically print information received from an image output device such as a personal computer. Typically, this received information is in the form of a raster scan image such as a full page bitmap or in the form of an image written in a page description language or a combination thereof. The raster scan image includes a series of scan lines consisting of bits representing pixel information in which each scan line contains information sufficient to print a single line of information across a page in a linear fashion. Printers can print bitmap information as received or can print an image written in the page description language once converted to a bitmap consisting of pixel information.

Information printed by a printer can be printed having the grayscale of the received information. The printer can also modify the received bitmap and print the information at a grayscale different than the one received. In either event, it is typical that grayscale printing is performed either by controlling the number of drops per pixel, by controlling the size of the white space between pixels, or both. One known method of improving image quality through grayscale control is to print pixels on a higher resolution grid in both the scan direction and the paper advance direction. Such methods require multiple passes of the printhead so that more drops are placed within a given region of the print medium. These methods also require small and very accurate paper advance steps for accurate placement of the drops on a high resolution grid. Because such methods require multiple passes of the printhead, print speed may be undesirably reduced. In addition, accurate paper advance steps may increase the cost of the printing system as such systems typically require advanced electronic controllers and expensive encoders which can be cost prohibitive.

Various methods and apparatus for printing images with scanning carriage type liquid ink printers have been developed. The following references describe these and other methods and apparatus for liquid ink printing.

U.S. Pat. No. 4,965,593 to Hickman describes a dot printer wherein the spacing of ink jet nozzles of a print head are spaced by an amount greater than the pixel spacing of the printing medium such that adjacent pixels are not printed until the deposited colorant has time to dry.

European Patent Application Publication No.623 473 to Holstun et al, describes increased print resolution in the carriage scan axis of an ink-jet printer. The increased print resolution is achieved by moving the carriage of an ink-jet cartridge in the carriage scan direction to provide a first resolution in that direction which is twice the second resolution in a print media advance direction. Two smaller drops of ink are fired onto each square pixel in a single pass of the cartridge so as to provide, for example, a 600 dpi resolution in the carriage scan axis with a 300 dpi resolution in the media advance direction.

SUMMARY OF THE INVENTION

In accordance with one aspect of the present invention, there is provided a liquid ink printing system for printing, from print data, an image on a recording medium, moving in a first direction along a path, including pixel locations being deposited with liquid ink drops. The printing system includes a printhead, located adjacent the path, including a plurality of drop ejectors, for depositing the liquid ink drops, an electromover, for moving the recording medium along the path, and a print driver, operatively coupled to the electromover and to the printhead, for controlling a plurality of relative velocities between the recording medium and the printhead, each of the plurality of relative velocities being associated with one of a plurality of grayscales.

Pursuant to another aspect of the present invention, there is provided a method of printing with a liquid ink printhead including drop ejectors ejecting ink drops at a drop ejection frequency at a plurality of pixel locations having a predetermined resolution on a recording medium moving along a path to form an image including a plurality of dots. The steps include examining an image quality selection, determining, as a function of the examined image quality selection, a relative velocity between the recording medium and the printhead for printing the image, and printing the image with the printhead ejecting ink drops on the recording medium with the relative velocity between the recording medium and the printhead being determined in said determining step.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
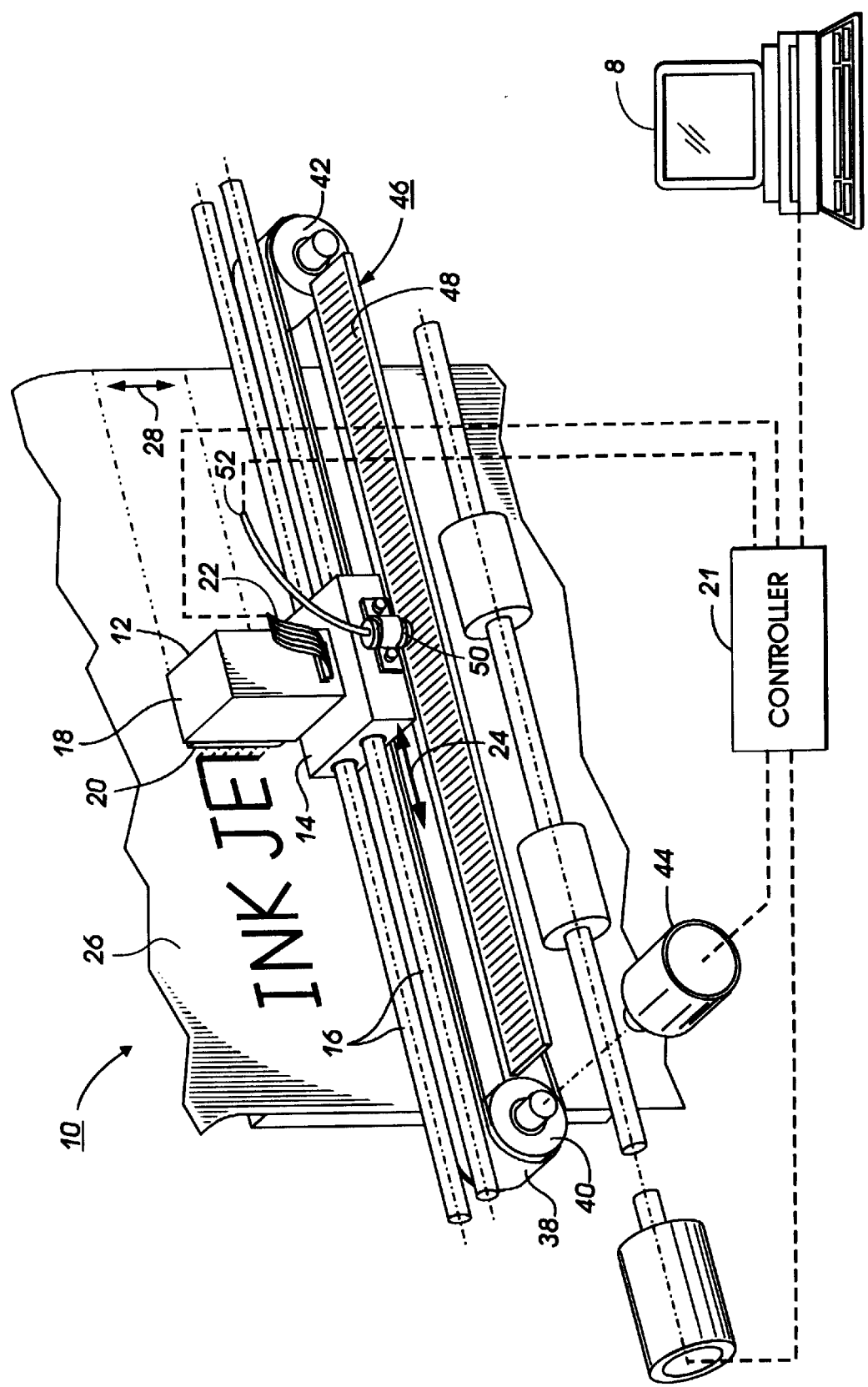
FIG. 1 is a partial schematic perspective view of a printing system incorporating the present invention.

FIG. 1 illustrates a partial schematic perspective view of a printing system including a personal computer 8, generating print data, coupled to one type of liquid ink printer, an ink jet printer 10, having an ink jet printhead cartridge 12 mounted on a carriage 14 supported by carriage rails 16. The printhead cartridge 12 includes a housing 18 containing ink for supply to a thermal ink jet printhead 20 which selectively expels droplets of ink under control of electrical signals received from a controller 21 of the printer 10 through an electrical cable 22. The signals generated by the controller 21 are generated in response to the print data generated by the personal computer 8 as is understood by one skilled in the art. Other image input devices are also possible, of course, such as a scanner, other computer image generators, and image storage devices. Such image data may include color information or monochrome information for printing by a color capable liquid ink printer.

The printhead 20 contains a plurality of drop ejectors, including ink conduits or channels (not shown) which carry ink from the housing 18 to respective ink ejectors, which eject ink through orifices or nozzles (also not shown). When printing, the carriage 14 reciprocates or scans back and forth along the carriage rails 16 in the directions of the arrow 24 at a constant speed or velocity. As the printhead cartridge 12 reciprocates back and forth across a recording medium 26, such as a sheet of paper or transparency, droplets of ink are expelled from selected ones of the printhead nozzles towards the sheet of paper 26. The ink ejecting orifices or nozzles are typically arranged in a linear array substantially perpendicular to the scanning direction 24. If printing in color, such a linear array can be segmented such that segments of the array deposit different colors of ink to complete a color image. Such a printer would necessitate that the housing 18 include separate portions or containers each including a different type or color of ink. During each pass of the carriage 14, the recording medium 26 is held in a stationary position. At the end of each pass, however, the recording medium is advanced or stepped in a paper advance direction 28 by a stepping mechanism or electromover under control of the printer controller 21. For a more detailed explanation of the printhead and printing thereby, refer to U.S. Pat. No. 4,571,599, U.S. Pat. No. Reissue 32,572, and U.S. Pat. No. 5,534,895 each of which are incorporated herein by reference.

It is well known and commonplace to program and execute imaging, printing, document, and/or paper handling control functions and logic with software instructions for conventional or general purpose microprocessors, such as the controller 21. This is taught by various prior patents and commercial products. Such programming or software may of course vary depending on the particular functions, software type, and microprocessor or other computer system utilized, but will be available to, or readily programmable without undue experimentation from, functional descriptions, such as those provided herein, or prior knowledge of functions which are conventional, together with general knowledge in the software and computer arts. That can include object oriented software development environments, such as C++. Alternatively, the disclosed system or method may be implemented partially or fully in hardware, using standard logic circuits or a single chip using VLSI designs.

The carriage 14 is moved back and forth in the scanning directions 24 by a belt 38 attached thereto. The belt 38 is moved by a first rotatable pulley 40 and a second rotatable pulley 42. The first rotatable pulley 40 is, in turn, driven by a reversible motor 44 under control of the controller 21 of the ink jet printer. To enable the present invention, the motor 44 is a variable speed motor which can be operated at different speeds to move the carriage 14 at different velocities. In addition to the toothed belt/pulley system for causing the carriage to move, it is also possible to control the motion of the carriage by using a cable/capstan, lead screw or other mechanisms as known by those skilled in the art.

To control the movement and/or position of the carriage 14 along the carriage rails 16, the printer includes an encoder having an encoder strip 46 which includes a series of fiducial marks in a pattern 48. The pattern 48 is sensed by a sensor 50, such as a photodiode/light source attached to the printhead carriage 14. The sensor 50 includes a cable 52 which transmits electrical signals representing the sensed fiducial marks of the pattern 48 to the printer controller to thereby measure actual printhead position. Highly accurate encoders are desirable as knowledge of actual printhead position improve the operation of the present invention. Other known encoders, such as rotary encoders are also possible.

Figure 2:
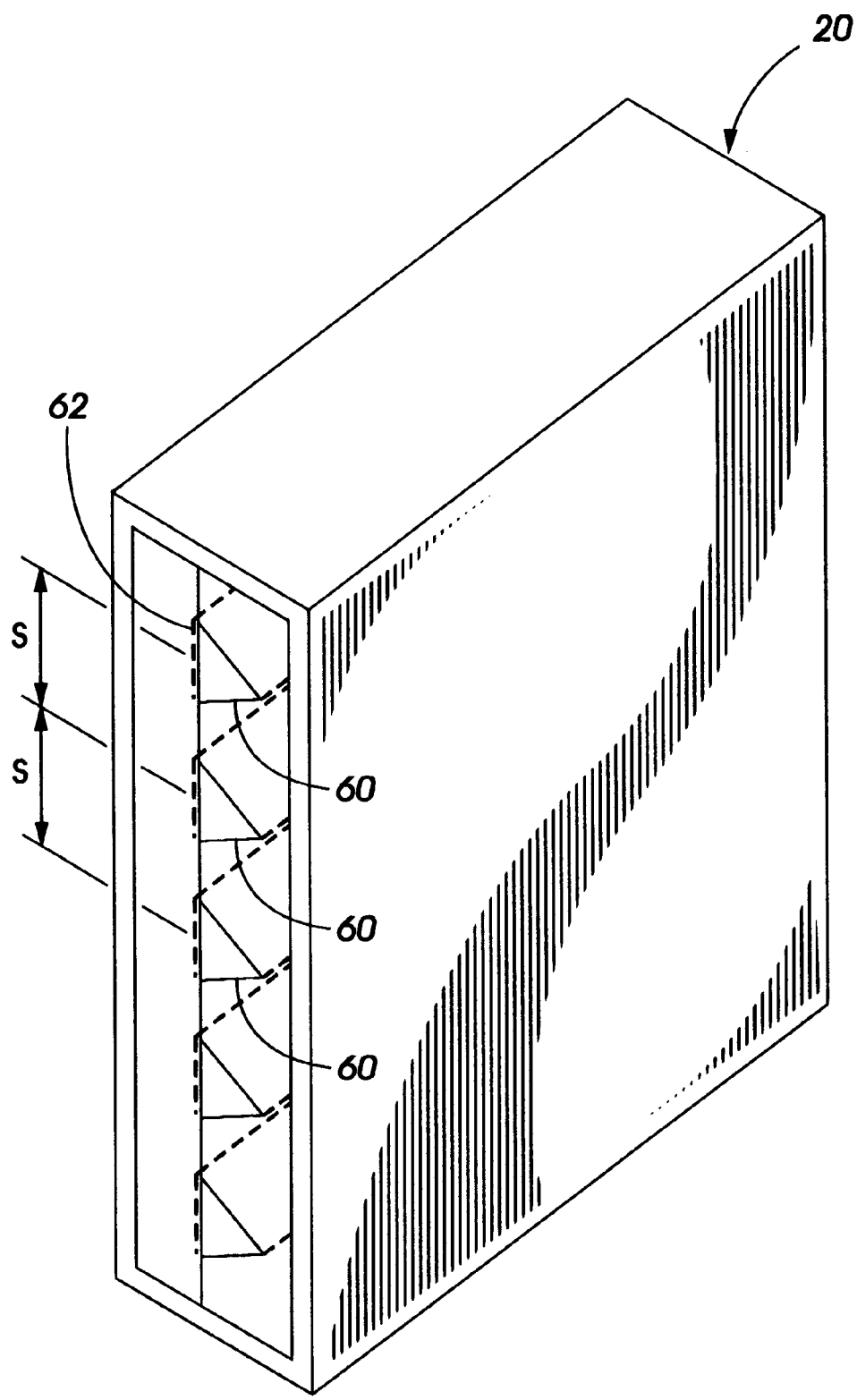
FIG. 2 is a schematic perspective view of an ink jet print cartridge having an ink jet printhead with ink ejecting nozzles and associated heaters incorporating the present invention.

FIG. 2 illustrates the printhead 20 of the present invention which includes a plurality of nozzles 60 which are spaced a distance S which may be equivalent to a desired resolution of the image in the paper advance or non-scan direction.

Partial steps in the paper advance direction are also possible to increase the resolution of the printed image over that of the nozzle spacing. For instance, the spacing S could be 300 spots per inch in the paper advance direction.

In determining the amount of ink necessary to be deposited by the nozzles 60 for grayscale printing of the present invention, it is important to determine how much optical density, and therefore ink volume, is necessary to provide the same amount of ink coverage in the known 300 by 300 resolution printing. It has been found that it takes approximately the same amount of ink or less to cover the page by printing successive small drops as for binary printing. Thus as long as the drop size can be decreased and the firing frequency increased, grayscale printing becomes a viable method for improving image quality. Smaller drop volumes also provide the additional benefit of faster refill time or recovery time for drop ejectors. The smaller drops also require less energy per drop thereby enabling more drop ejectors to be energized simultaneously. Reducing the spot size improves image quality regardless of whether it is reduced from 300 spots per inch to a 600 spot per inch spot size still spaced at 300 spots per inch or to some intermediate spot size. The lightest gray level and the spacing between gray levels is determined by the spot size. Consequently, the described invention can provide significant improvements in grayscale.

Since the printhead 20 includes smaller nozzles, multiple drops are necessary to fill a desired pixel since the spacing of the nozzles dictates the size of the pixel grid unless fractional step advances are used. As used herein, a "pixel" refers to an image signal associated with a particular position in an image having an optical density between a minimum and a maximum. Accordingly, pixels are defined by intensity and position. The pixels may refer to a particular position, region, or superpixel (collection of pixels) in the output image. The image data pixels are commonly grouped into separations. Each separation provides a set of image signals or separation pixels. These might be used to drive a printer to produce one color separation of the image. In the case of multi-color printers, these separations, superimposed together, form the color image. In this context, pixels are described as discrete image signals which represent optical density of the document image in a given small area. In this description, the term gray will be used for pixel values which vary between maximum and minimum, irrespective of the color of the separation in which the signals are used. In addition, the present invention is not limited to a color space using cyan, magenta, yellow, and black but also other color spaces such as color spaces having more than 4 colorants, other common color spaces, such as r, g, b, or color spaces such as those including luminance, chroma, and hue. Likewise, the present invention includes the use of any colorants or inks such as cyan, magenta, yellow, and black but also including but not limited to orange, red, green, blue, light cyan, light magenta, light yellow, and light black or gray.

Figure 3:
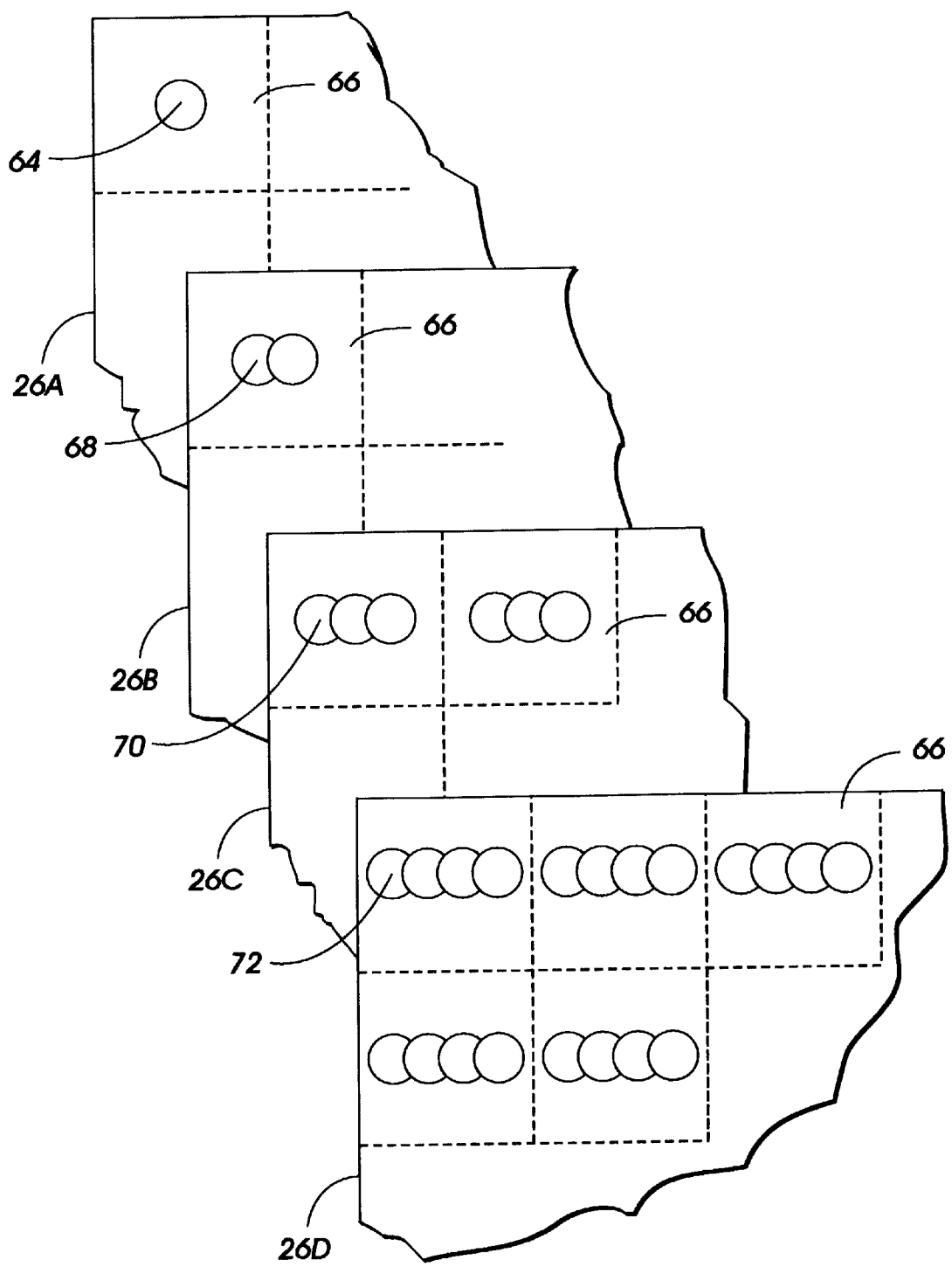
FIG. 3 illustrates the locations of ink drops deposited by the printhead on a plurality of recording mediums according to the present invention.

For purposes of illustration, assuming the nozzle spacing of the printhead 20 is 300 spots per inch, it is possible to achieve a number of grayscales or gray levels by selecting the number of drops per pixel which are to be deposited. For instance as illustrated in FIG. 3, multiple grayscales are possible. A recording medium 26A, for instance, illustrates a first level of grayscale, which might also be considered to be a draft mode, wherein only a single drop 64 of ink (illustrated before spreading) is deposited on any one of a plurality of pixel areas 66 (one illustrated). Such a draft mode might be useful to preview the alignment of image information on a completed document. For another recording medium 26B, a second level of grayscale can be achieved by depositing no more than two drops 68 of ink on any one of the pixel locations 66. In a third level of grayscale, a recording medium 26C has no more than three drops 70 deposited in any one of the pixel areas 66. As a final example, no more than four drops 72 of ink are deposited on any of the pixel locations 66 of a recording medium 26D.

The present invention is also applicable to other printing methods, including known checkerboard printing and others such as that described in previously referred to U.S. patent application "Checkerboard Printing for Multiple Drops per Pixel Ink Jet Printing". Checkerboard printing is enabled in any of the multiple drop per pixel grayscale resolutions by depositing ink at non-adjacent pixel locations, in the horizontal and vertical directions, in a single pass of the printhead, where one or more pixel locations are left un-printed during a single pass. A second pass or more of the printhead, after a partial advance of the recording media completes the pixel locations.

It has been found, that grayscale printing with liquid ink can be greatly improved by depositing a number of small ink drops unequally or equally spaced within a pixel space where each drop has a different drop center but which are clustered near the center of the pixel space, such as described in U.S. patent application "Liquid Ink Printing With Small Drop Overprinting", Ser. No. 08/673,517, to David Mantell. Such drops are deposited in rapid succession within the pixel space such that ink of each drop mixes and spreads into a larger single spot. Most inks will spread more in the direction perpendicular to the printhead motion since the drops are already spread out in the direction of motion. Only inks that effectively do not spread at all (very slow dry inks) or inks which finish spreading faster than the drops can be deposited (extremely fast dry ink) would be excluded. Thus the drops will tend toward the size and shape of a single drop having the same amount of ink, only slightly elongated in the printhead motion direction.

The described ink spreading phenomenon occurs because at the high drop frequencies of an ink jet printer, typically greater than 5 kHz, the drops arrive on the paper faster than they are able to spread. For instance, the single ink drop 64 (illustrated as an actual ink drop before spreading) will have a size slightly larger than the initially deposited drop due to drop spreading but which will be smaller in size than the size of an ink drop deposited by a single nozzle depositing a standard drop size in a 300 spot per inch printer. The two ink drops 68 will result in a drop larger than that achieved by the single drop 64. The ink spreads in the paper advance direction more so than in the scanning direction and the resulting drop includes a fairly circular appearance.

Paper type can also be an important factor in drop spreading. For instance, it has been found that Springhill 6T paper wets more rapidly than Xerox Recycled paper. Consequently, by the selection of paper and the selection of the liquid ink, drop spreading can be optimized to achieve desired printing results. For instance, different quality printing modes, such as draft mode or high quality mode, can be made by the selection of recording mediums as well as inks.

Figure 4:
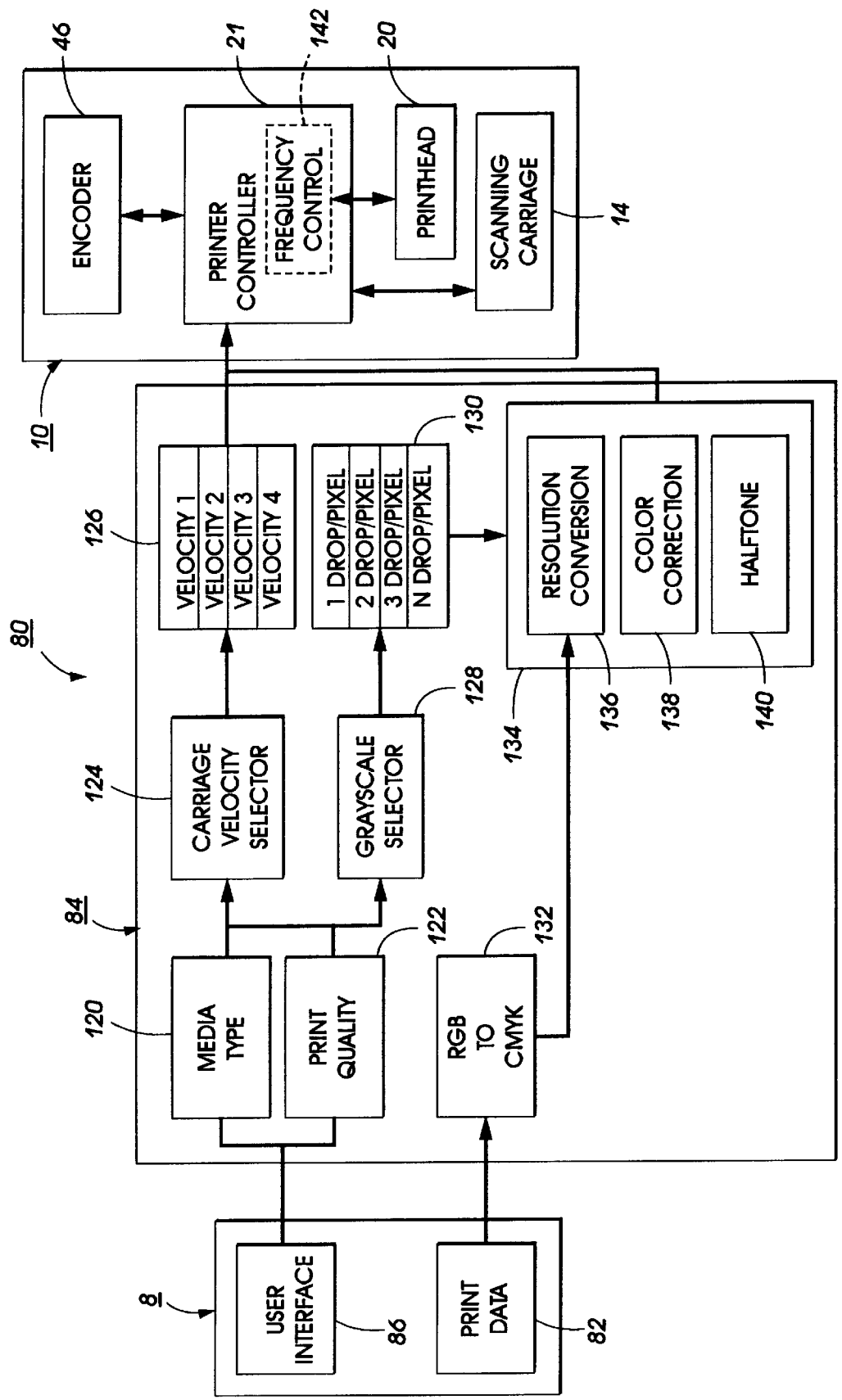
FIG. 4 illustrates a schematic block diagram of a printing system including a print driver according to the present invention.
Figure 5:
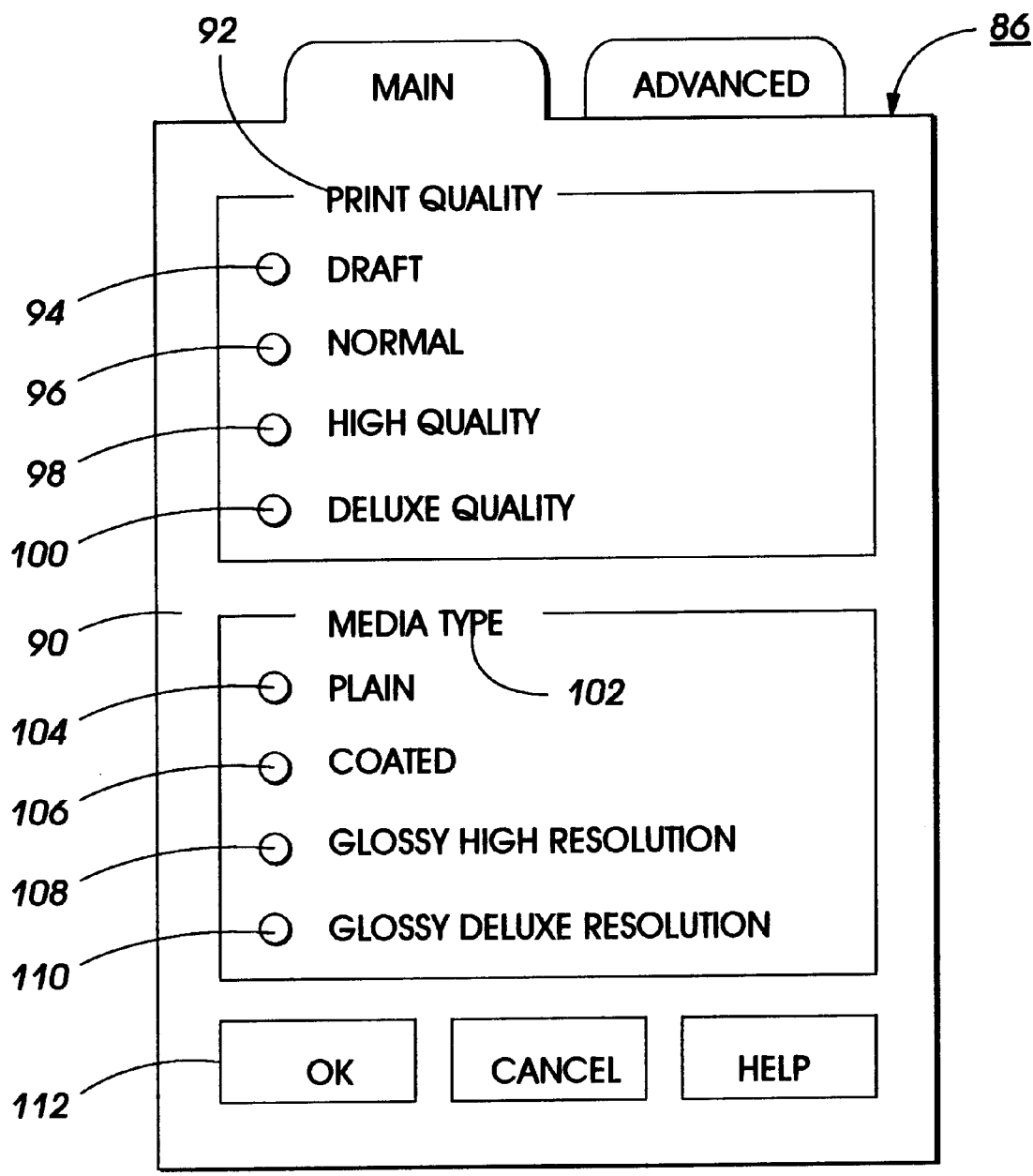
FIG. 5 illustrates an embodiment of a user interface for use in the present invention.

The ink jet printer 10 is included in a basic image processing system 80 of FIG. 4. In the system 80, an electronic representation of a document or image from the personal computer 8 here illustrated as print data 82, is transferred to a print driver 84. The print data 82 includes electronic digital data in some form from an original image or from another source, in a format related to the physical characteristics of the personal computer, typically including pixels. While a personal computer is shown, other known image input terminals, including a scanner, other computer image generators, or image storage devices are also possible. In the instance of the personal computer 8, a user interface, such as illustrated in FIG. 5, is present on the display device of the personal computer 8 for providing for a variety of user selections for printing documents. The user interface 86, is likewise connected to the print driver 84, also known as an image processing unit. The print driver 84 processes the print data 82 in accordance with items selected by the user on the user interface 86 as well as other processes to be described. Once the print data has been processed by the print driver 80, the processed information is transmitted to the printer 10 here schematically illustrated to include the printer controller 21 being coupled to the printhead 20, the scanning carriage 14 and the encoder 46. While manipulation of the print data is shown to occur in the print driver 84, it can also occur in the image output terminal or printer 10.

The present invention includes a print driver which can be accessed through the user interface 86 to set the level of grayscale to be used for a particular image. In addition, the level of grayscale selected is used to control the velocity of the carriage 14 as it scans across the page, such that a range of grayscales or print modes are available to the user depending on the desired quality of output in the final document. By controlling the carriage speed relative to the grayscale, print quality selected, or printing method, such as checkerboarding, a number of advantages are possible. One is that a wide variety of levels of high quality grayscale are possible with a single printer. The present invention includes a printhead carriage capable of scanning at multiple velocities. Two, given that there are a range of ink jet papers available to the user, the user can choose the number of drops printed per pixel that matches the choice of recording medium. In this manner, the printer can accept new paper products which were not in existence at the time the printer was produced. Third, ink savings of the economy modes, such as a draft mode, are greater because of the smaller than normal drop volumes deposited by the printhead. Fourth, the draft mode prints at a much faster rate than comparable products that print with larger standard sized drop volumes.

One important characteristic of the present invention is that the velocity of the carriage is set by the print driver according to the level of grayscale which is selected. For instance, the user selects from a first screen 90 (see FIG. 5) of the user interface 86, one of a plurality of print quality modes 92, which can include, for instance, a draft mode 94, a normal mode 96, a high quality mode 98 and a deluxe quality mode 100. In addition, when one of the print quality modes 92 is selected, one of a plurality of media types 102 can be selected which include the selection of plain paper 104, coated paper 106, glossy high resolution paper 108 and glossy deluxe resolution paper 110. Print quality mode selections as well as media type selections affect image quality. It is also possible, that upon selection of one of the print quality modes 92, the print driver 84 might automatically highlight one of the media types 102 as a recommendation to the user to use that type of media when printing in the selected print quality mode. Upon selection of one of the print quality modes and one of the media types, the user would, if satisfied with the selections, would select the OK selector 112 to begin printing.

Returning to FIG. 4, the print driver 84 receives the information from the user interface 86 and stores the transmitted media type in a media type buffer 120 and stores the selected print quality type in a print quality type buffer 122.

A carriage velocity selector 124 then analyzes the media type as well as the print quality type. Based upon the combination thereof, one of four or more print carriage velocities stored in, for instance, a velocity lookup table 126 are selected. A carriage velocity signal is subsequently transmitted to the printer 10 in accordance with the selected velocity. It is also possible for the print driver to generate one of the plurality of relative velocities as a function of the number of passes of the printhead across a portion of the recording medium when, for instance, printing in a checkerboarding mode.

Each of the velocities corresponds to one of the print modes previously described in FIG. 3. Velocity 1 might be the fastest velocity of the print carriage and would correspond to the print mode shown for the recording medium 26A. Velocity 2 would be slower than velocity 1 and would be applied to the printhead carriage during printing of the recording medium 26B. Continuing along the same line, velocity 3 would be used during printing of the recording medium 26C and velocity 4 would be applied to printing of the recording medium 26D. In this fashion, the relative velocity between the printhead and the media are changed depending on the level of grayscale desired. Consequently, the present invention is also applicable to pagewidth printers where a pagewidth printhead is held stationary and the recording medium is moved past the stationary printhead at different velocities wherein each velocity corresponds to a desired grayscale.

To enable printing with various carriage speeds as described, it is necessary to establish the maximum firing frequency of the printhead as well as to determine the electronic accessing frequency of the transmission of any print information which is transmitted to the printhead 20 for causing the drop ejectors to eject ink. If the carriage speed is such that a one pixel distance is traveled at the maximum firing frequency, there is no high addressability. For the present invention, however, the maximum firing frequency is used to determine a maximum carriage velocity to be used by the printer in, for instance, the draft mode. The other carriage velocities are then determined based on the maximum velocity. For instance, the carriage velocity is slowed by a factor of N depending on which of the print quality modes are selected, where N is the number of drops being deposited per pixel.

Frequently, the gear ratios of the motors used to control the carriage velocity do not allow for a continuous variation of the carriage velocity. Thus, it may be necessary to adjust the drop ejection or firing frequency in order to match the carriage velocity to the number of drops being deposited. In order to keep the firing frequency below the maximum allowable frequency, this usually means that the firing frequency is lowered to accommodate for a carriage velocity matched to the particular motor. This can be accomplished by changing the frequency at which the electronic control circuitry addresses, from one group of drop ejectors to another, a complete printing cycle from one end of the printhead to the other, also known as "ripple". Alternatively, this can be done by inserting a time delay or pause between successive ripples of the printhead control circuitry. Other conditions might also require a change in firing frequency, such as the thermal load on the printhead, as is known in the art of ink jet printing. On the other hand, sometimes the nominal maximum continuous firing frequency can be exceeded for short bursts, as might occur in checkerboard printing. Thus a new effective maximum firing frequency is established for such printing modes. This allows additional room for adjustment of the firing frequency once all of the other printing parameters are determined. Those parameters are the number of drops per pixel deposited in a pass of the printhead across the recording medium and the available carriage velocities. In other words, the frequency is adjusted to be equal to or greater than the velocity times the number of drop per pixel per pass.

As an example, take the case of a printer providing multiple drops per pixel through higher resolution in the carriage scan direction. The common method of achieving two pass checkerboarding is to print every other drop along a horizontal scan line on each pass of the printhead. In this case, if the carriage velocity is kept constant from the first pass to the second pass, then the effective firing frequency is reduced by 2 times. But, for the present invention, it is possible to increase the carriage speed by 2 times. This maintains the same firing frequency as in the one pass printing mode and preserves the overall throughput of the printer. Eventually, for higher multiple pass modes (e.g. 4 pass printing) a limit is reached for the maximum carriage velocity. Thus the firing frequency in those modes are not limited by the maximum firing frequency of the printhead but by the maximum carriage velocity.

The first enabler of multiple carriage velocities is that the printhead 20 is designed to produce smaller drops than a standard printhead printing one drop per pixel for a given printer resolution. Because the printhead is designed to produce smaller drops, the natural firing frequency and the number of drop ejectors that can be filed simultaneously are greater, thereby in effect, compensating for the larger number of drops printed per pixel. In this manner, the throughput can be kept high even though more drops are printed per pixel and the ink loading on the paper can still be kept roughly constant. The second enabler is that the carriage velocity is set by the print driver 84 through selections on the user interface 86 such that the grayscale is controlled by the print driver. As an example, the draft mode would print one drop per pixel, or for instance a minimum number of drops per pixel N, the normal mode would print two drops per pixel, the high quality mode would print three drops per pixel and the deluxe quality mode would print four drops per pixel, or for instance a maximum number of drops per pixel Y as illustrated in FIG. 3 for the recording medium 26D. It is also possible that even higher quality print modes can be achieved using more drops per pixel and special papers which effectively cause reduced spot sizes thereby enabling an even greater number of drops to be printed per pixel. In this fashion, not only does the user indirectly select the velocity of the printhead carriage, but also indirectly selects the level of grayscale and the number of bits per pixel. By including multiple levels of grayscale, it is also possible to reduce the special paper requirements since grayscale is not completely coupled to the type of paper being used but depends on the number of drops per pixel being deposited. In fact, the user could determine the darkness of the black level and how saturated the colors appear by choosing the level of grayscale which relates, of course, to the number of drops per pixel.

To enable the selection of the number of drops per pixel, the print driver 84 includes a grayscale selector 128 which analyzes the media type selected as well as the print quality selected to select one of a plurality of drops per pixel from a drops per pixel lookup table 130. Each print quality mode can be characterized by the maximum number of drops per pixel which can be deposited during the formation of an image. For instance, when printing in a draft mode no more than one drop per pixel is printed at any one of the pixel locations. In a hardware implementation of the present invention, the carriage velocity selector 124 and lookup table 126 as well as the grayscale selector 128 and lookup table 130 could be embodied in a multiplexor demultiplexor combination for selection of the proper velocity as well as number of drops per pixel.

After the drops per pixel have been selected, a CMYK device independent version of the print data 82, which has been generated by an RGB to CMYK converter 132, is converted to device dependent data necessary for printing a final image by the printer 10. The conversion is performed in a rendering converter 134 as is known by those skilled in the art which can include resolution conversion 136, color correction 138, and halftoning 140. Once the correction has been made the transformed print data is now transmitted to the printer controller 21 and includes signal information reflecting the maximum number of drops per pixel to be used when printing the image. The printer controller 21 then controls the scanning carriage velocity according to the velocity signal transmitted from the printer driver and also controls the ejection of ink by the printhead 20 such that multiple drops or single drops per pixel are emitted from the printhead in accordance with the selected print quality as well as media types. In addition, the printer controller 21 can includes a frequency controller 142 if the frequency needs to be adjusted to match the available carriage speeds which can be accurately produced by a given carriage drive motor. If so, the velocity signal or a frequency control signal generated by the print driver 84 and transmitted to the printer 10 can include signal information for controlling drop ejector frequency. The encoder 46 ensures accurate positioning of the printhead as the printhead scans across the recording sheet such that the placement of multiple or single drops with any single pixel is accurately controlled.

The present invention utilizes higher quality encoders that measure the actual printhead position, while avoiding the use or necessity of using higher quality types of encoders tied to the paper advance mechanism. This efficiently optimizes the use of multiple levels of grayscale within a single printer, because precision motion in the paper advance direction is not necessary. For instance, print modes requiring higher addressability in a paper advance direction such as a 1200×1200 mode using a 600 dot per inch printer would require additional cost encoders in the paper advance direction and would be unlikely to have the same performance specifications for controlling motion in the carriage direction. Consequently, the present invention of changing carriage velocity with respect to print mode as well as controlling the number of drops per pixel provides for a high quality printer having a reduced cost since a printer can operate effectively without the need for high cost encoders in the paper advance direction.

In recapitulation, there has been described a liquid ink printer having multiple grayscale printing. Multiple level grayscale printing is enabled by providing a printer having a scanning carriage which can be operated at a variety of speeds such that for each speed of the carriage a different plurality of drops per pixel is selected to thereby produce multiple levels of grayscale. While the present invention has been described in conjunction with a specific embodiment thereof, it is evident that many alternatives, modifications, and variations will be apparent to those skilled in the art. For instance, the present invention is not limited to thermal ink jet printing but includes all types of printing where liquid drops are deposited on a recording medium or an intermediate including but not limited to acoustic ink jet printing as well as phase change wax based printing. In addition, the present invention is not limited to color printing but includes monochrome printing as well. Accordingly, the present invention is intended to embrace all such alternatives, modifications, and variations that fall within the spirit and broad scope of the appended claims.

What is claimed is:

1. A liquid ink printing system for multiple level grayscale printing, from print data, an image on a recording medium, the recording medium moving in a first direction along a path, and including pixel locations thereon for receipt of liquid ink drops, comprising:
   a printhead, located adjacent the path, including a plurality of drop ejectors, for selectively depositing one or more liquid ink drops per pixel location on the recording medium;
   an electromover, for moving the recording medium along the path;
   a user interface having a plurality of print quality modes and a plurality of types of recording medium presented for selection by a user prior to printing;
   a print driver, operatively coupled to said electromover, user interface, and to said printhead, the print driver having means for selecting one of a plurality of relative velocities between the recording medium and said printhead in response to a selection of a print quality mode and a type of recording medium from the user interface by a user, said plurality of relative velocities being previously stored in the print driver with each of said plurality of relative velocities being associated with one of a plurality of grayscales, whereby the print driver controls the relative velocity between the printhead and recording medium at the relative velocity and associated grayscale selected by said selecting means.

2. The printing system of claim 1, comprising a scanning carriage, coupled to said printhead, for moving said printhead across the recording medium in a second direction substantially perpendicular to the first direction.

3. The printing system of claim 2, wherein the selecting means of said print driver includes a velocity signal selector, for generating a plurality of velocity signals, each of said plurality of velocity signals being generated to move said scanning carriage at one of said plurality of relative velocities.

4. The printing system of claim 3, wherein the selecting means of said print driver further includes a grayscale selector, for generating a plurality of grayscale signals, each of said plurality of grayscales being generated to print the image at one of said plurality of grayscales.

5. The printing system of claim 4, wherein each of said grayscale signals is for specifying a maximum number of liquid ink drops per pixel for deposition in each of said plurality of grayscales.

6. The printing system of claim 5, wherein said velocity signal selector generates a first velocity signal associated with the deposition of N drops per pixel and a second velocity signal associated with the deposition of Y drops per pixel.

7. The printing system of claim 6, wherein said first velocity signal causes said scanning carriage to move at a first velocity; wherein said second velocity signal causes said scanning carriage to move at a second velocity; and wherein the first velocity is greater than the second velocity, and the N drops per pixel is less than the Y drops per pixel.

8. The printing system of claim 1, wherein each of said plurality of grayscales corresponds to a maximum number of ink drops being deposited at the pixel locations.

9. The printing system of claim 8, wherein said print driver generates a frequency control signal for controlling the drop ejection frequency as a function of one of said plurality of relative velocities.

10. A liquid ink printing system for multiple level grayscale printing of an image on a recording medium in response to print data received, the recording medium being movable along a path in a first direction and including pixel locations thereon, said printing system comprising:
    a user interface having a plurality of print quality modes, each of which represents a level of grayscale printing, and a plurality of types of recording medium, the user interface being used by a user to select one of the print quality modes and one of the types of recording medium prior to printing by the printing system;
    a printhead having a plurality of drop ejectors for selectively depositing one or more liquid ink drops per pixel location on the recording medium, the printhead being located adjacent the path along which the recording medium is moved;
    an electromover for moving the recording medium along the path; and
    a print driver being operatively coupled to the printhead, user interface, and electromover, the print driver having a velocity selector with a first storage means containing a plurality of predetermined relative velocities between the printhead and recording medium stored therein and a grayscale selector with a second storage means containing a plurality of predetermined number of drops per pixel location stored therein, the velocity selector and grayscale selector each respectively analyzing a print quality mode and a type of recording medium selected by the user, the velocity selector selecting a one of the predetermined relative velocities in the storage means and generating a velocity signal indicative thereof, the grayscale selector selecting a one of the predetermined number of drops per pixel location stored in said second storage means and generating a grayscale signal representative thereof, the print driver controlling the relative velocity between the printhead and recording medium and the number of drops per pixel location during printing of the image on the recording medium by the printhead in accordance with both the velocity signal and the grayscale signal.

11. The printing system as claimed in claim 10, wherein the printhead is a stationary, pagewidth printhead and the recording medium is moved past the pagewidth printhead in said first direction at a constant velocity selected by the velocity selector of the print driver.

12. The printing system as claimed in claim 10, wherein the printhead is mounted on a reciprocating carriage and the recording medium is held stationary while the printhead is moved in a second direction which is perpendicular to the first direction, the moving printhead printing a swath of image on the recording medium at the velocity selected by the print driver, the recording medium being advanced in said first direction after the swath is printed by the distance of a height of a printed swath, during which advancing of the recording medium the printhead does not print.

13. The printing system as claimed in claim 10, wherein the first and second storage means are first and second lookup tables, respectively; and wherein each grayscale signal specifies a maximum number of liquid ink drops per pixel location to be deposited.

14. The printing system as claimed in claim 13, wherein said relative velocity is slowed by a factor of N where N is the number of drops per pixel location.

15. A method for multiple level grayscale printing of an image on a recording medium by a liquid ink printing system in response to print data received by said printing system, the recording medium being movable along a path in a first direction and including pixel locations thereon, the method for printing comprising the steps of:

(a) providing a user interface having a plurality of print quality modes, each of which represents a level of grayscale printing, and a plurality of types of recording medium;

(b) providing a printhead having a plurality of drop ejectors adjacent the path along which the recording medium is moved, each ejector being adapted to deposit one or more liquid ink drops per pixel location on the recording medium;

(c) moving the recording medium along the path by an electromover;

(d) operatively coupling a print driver to the printhead, user interface, and electromover, said print driver having a velocity selector with a first storage means and a grayscale selector with a second storage means;

(e) entering a plurality of predetermined relative velocities between the printhead and recording medium in said first storage means and entering a plurality of predetermined number of drops per pixel location in said second storage means;

(f) selecting a one of the print quality modes and a one of the types of recording medium from the user interface prior to printing by the printing system;

(g) analyzing a print quality mode and a type of recording medium selected from the user interface by both the velocity selector and the grayscale selector in order to enable a selection from the respective first and second storage means by said velocity selector and grayscale selector;

(h) selecting a one of the plurality of predetermined relative velocities stored in the first storage means by the velocity selector and selecting a one of the plurality of predetermined number of drops per pixel location stored in the second storage means by the grayscale selector;

(i) generating a velocity signal indicative of said selected relative velocities by the velocity selector and generating a grayscale signal indicative of the selected number of drops per pixel location; and (j) controlling the relative velocity between the printhead and recording medium and the number of drops per pixel location during printing of the image on the recording medium by the printhead in response to the velocity signal and the grayscale signal.

16. The method as claimed in claim 15, wherein the first and second storage means are first and second lookup tables, respectively; and wherein each grayscale signal specifies a maximum number of liquid ink drops per pixel location to be deposited.

17. The method as claimed in claim 16, wherein said relative velocity is slowed by a factor of N where N is the number of drops per pixel location.

* * * * *